Figure 1:
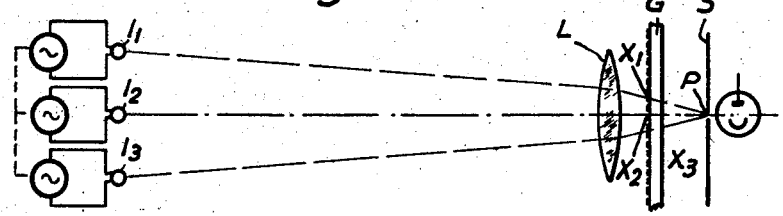

Oct. 13, 1964  R. W. WILDE  3,153,148
MODULATION OF ELECTRIC CURRENTS AND LIGHT BEAMS
Filed April 21, 1960

INVENTOR
Richard Walter Wilde
BY
Larson and Taylor

United States Patent Office 3,153,148
Patented Oct. 13, 1964

3,153,148
MODULATION OF ELECTRIC CURRENTS
AND LIGHT BEAMS
Richard Walter Wilde, Bedford, England, assignor to National Research Development Corporation, London, England, a British corporation
Filed Apr. 21, 1960, Ser. No. 23,701
Claims priority, application Great Britain Apr. 23, 1959
22 Claims. (Cl. 250—237)

The present invention relates to the modulation of a beam of light by an optical grating as used for example in metrological applications. In the application of gratings for displacement measurement it is customary for light to pass through two adjacent gratings to a photocell. The two gratings, one of which may be termed the measurement grating and the other which may be termed the reference grating are of similar spacing and are disposed with their respective rulings parallel or nearly parallel so as to form moiré fringes when the measurement grating is displaced. Under these conditions relative movement of the gratings transverse to their rulings causes a periodic variation of the light falling upon the photocell whose output thus registers the relative movement.

It has previously been shown in United States patent application No. 823,150, filed June 26, 1959, that great advantage results from the use of a continuously moving comparison grating or gratings in such systems of displacement measurement but a moving comparison grating is difficult to arrange, involves mechanical movement and possible undesirable vibration. Another system is proposed in that application for very precisely setting the position of a main grating with respect to an index grating by the use of a vibrating index grating when the same problems arise. An object of the present invention is to avoid these problems without introducing further difficulties which are as great.

The present invention provides a multiphase arrangement by which a moving grating can be usefully simulated without moving parts. The movement simulated can be a continuous movement or a vibratory movement. The invention will first be described with reference to the use of a multiple light source and single photoelectric cell but as will be explained the inverse arrangement is possible. Also for convenience a transmission grating will be referred to, but the invention can also be put into effect using a reflection grating by suitably rearranging the various components.

If now a single component of a multiple light source is used to illuminate an optical grating, then the effect on a screen placed optically on the far side of the grating will be to give a certain spatial distribution of illumination depending on the grating and angle of incidence of the light. By suitably combining the patterns of illumination from all the components together with appropriate time modulation of the components, many useful effects can be achieved, for example the effect of a continuously moving grating or a vibrating grating. Since physical movement of the grating is no longer necessary, the mechanical problems are greatly reduced. The necessary modulation of the light source is effected by electric circuits. To get the necessary response from the light source may need considerable attention to the detailed design of the circuits but this is simpler to achieve than the mechanical problems presented by physical movement of the grating or light source and once solved, for any particular case, is simpler to maintain.

In carrying out the present invention a plurality of beams are directed on to the grating in mutually inclined directions so that they reach a common area on the screen on the far side of the grating (this screen may itself be a grating), and the beams are so directed that the spatial distribution of light intensity on the screen is related to the time modulation of the light components in such a way that the illumination of the area on the screen is time and space modulated in the desired manner.

Figure 2:
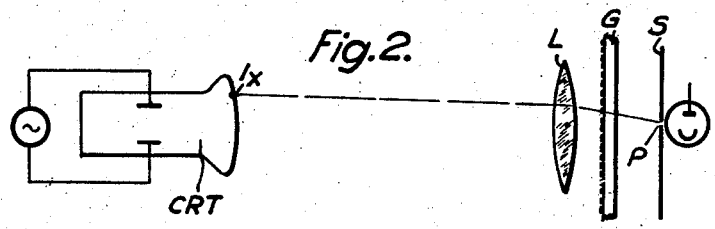
Figure 3:
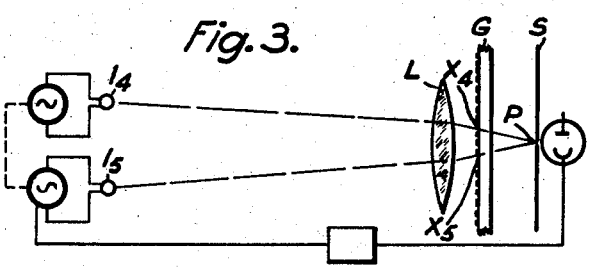
Figure 4:
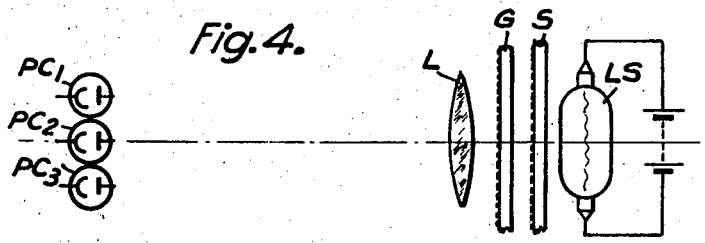

To clarify the manner in which this result is achieved, some examples of application will now be described in further detail with reference to the accompanying diagrammatic drawings in which:

FIG. 1 shows an arrangement for obtaining the effect of a constantly moving grating,
FIG. 2 shows a modification of FIG. 1,
FIG. 3 shows an arrangement for obtaining the effect of a vibrating grating, and
FIG. 4 shows an inversion of FIG. 1.

Referring now to FIGURE 1 light from three sources of intensities $I_1$, $I_2$, $I_3$ is collimated (as by a lens diagrammatically indicated at L) so that the collimated light from the sources meets at a typical point P on a screen S after passing through a fixed optical grating G. It will be seen that the slight inclination of the axes of the beams from sources $I_1$ and $I_3$ to the axis of the lens L will result in the collimated beams being at a slight angle to one another. Thus the point P receives light from source $I_1$ via a point $X_1$ on the grating G, from source $I_2$ via a point $X_2$ and from source $I_3$ via a point $X_3$, if the grating is coarse enough for diffraction effects to be neglected. It may here be mentioned however that diffraction effects may be used to advantage in other configurations. The light intensity at P due to any one source will be the product of the intensity of that source (conveniently represented by the same symbol as the source) and the transmittance at the corresponding point on the grating G and the total intensity $I_p$ at P will be the sum of the intensities due to the three sources.

Assuming now for simplicity that the grating G has a sinusoidal density distribution along its length of periodicity (ruling width) $w$, and if $x$ is the distance from some datum and $Tx$ is the transmittance at $x$, for normally incident light, then $Tx$ will be proportional to $$\sin 2\pi\left(\frac{w}{x}\right)$$

i.e. it is a simple sine function of periodicity $w$ and by suitably choosing the parameters we can write $$Tx = \frac{1}{2}\left[\left(1 + \sin 2\pi\left(\frac{x}{w}\right)\right)\right]$$

If now the angles of the beams and the spacing between the grating G and screen S are chosen so that the distances $X_1-X_2$ and $X_2-X_3$ are both equal to $$\frac{w}{3}$$

the transmittances at the three points $X_1$, $X_2$, $X_3$ may be written $$Tx_1 = \frac{1}{2}\left[1 + \sin 2\pi\left(\frac{x}{w}\right)\right]$$

$$Tx_2 = \frac{1}{2}\left[1 + \sin 2\pi\left(\frac{x}{w} + \frac{1}{3}\right)\right]$$

$$Tx_3 = \frac{1}{2}\left[1 + \sin 2\pi\left(\frac{x}{w} + \frac{2}{3}\right)\right]$$

so that provided the beams are substantially normal to the grating the illumination from three constant light sources at any point on the screen is the sum of three sine waves of intensity, symmetrically spaced along the grating. If now the three sources are so modulated at frequency $f$ that $$I_1 = I[1 + \sin 2\pi ft]$$
$$I_2 = I[1 + \sin 2\pi(ft + \frac{1}{3})]$$
$$I_3 = I[1 + \sin 2\pi(ft + \frac{2}{3})]$$

then the illumination at P may be written $$I_p = \frac{1}{2} I [1+\sin 2\pi (ft)]\left[1+\sin 2\pi\left(\frac{x}{w}\right)\right]$$
$$+\left[1+\sin 2\pi\left(ft+\frac{1}{3}\right)\right]\left[1+\sin 2\pi\left(\frac{x}{w}+\frac{1}{3}\right)\right]$$
$$+\left[\left(1+\sin 2\pi\left(ft+\frac{2}{3}\right)\right)\right]\left[1+\sin 2\pi\left(\frac{x}{w}+\frac{2}{3}\right)\right]$$

This expression resolves to $$I_p = \frac{3}{2} I\left[\left(1-\frac{1}{2}\cos 2\pi\left(ft+\frac{x}{w}\right)\right)\right]$$

This illumination is the same as that which would be obtained by a constant intensity $\frac{3}{2}I$ modulated by a travelling wave of sinusoidal form having a velocity $fw$ and an amplitude $\frac{3}{4}I$.

A similar result is obtained if the density distribution of the grating G is not sinusoidal and the modulation of the light sources is not sinusoidal provided that both modulations contain only certain odd harmonics (though the presence of some even harmonics is not necessarily injurious) of the fundamental frequency. For instance gratings of the bar and slot type may be used.

A suitable light source is a mercury argon discharge lamp as this gives a light output which over a useful range is proportional to applied voltage and which is of useful colour. The response of such a discharge lamp makes the modulation relatively simple to provide. It may also be possible to provide the several separate discharges in a single envelope.

It will be understood that in all cases, if necessary, light filters may be used.

The sense in which the travelling wave moves will be determined by the order of modulation of the components of the source just as the direction of rotation of a three-phase induction motor can be determined. It is here convenient to mention also that just as an induction motor can be made for more than three phases so in the present case there may be more than three light sources. The consequent changes in the relative spacings and so forth will be readily understood. It will also be understood that the light need not be incident substantially normally to the grating but can be inclined in the plane of the length of the grating. This makes the corresponding equations more complex but the underlying principle would not be changed. Such inclination may be necessary for instance if a reflection grating is used, though in this case it may also be sufficient to include the light in plane parallel to the rulings and not in planes parallel to the length of the grating in order to accommodate the photoelectric cell which would have to be on the same side of the grating as the light sources.

Where the effect of continuous motion is wanted, a three-phase light source suffices and is the most economical arrangement but an increase in the number of phases can be developed up to the equivalent of an unlimited member by substituting a cathode ray tube as the light source. By imposing suitable control patterns on the deflecting electrodes of the cathode ray tube space and time modulation patterns of a highly elaborate character can be used.

Such an arrangement is diagrammatically illustrated in FIGURE 2 where as in FIGURE 1, a collimating lens is marked L, a stationary grating G and a screen S. The light source here consists however of an illuminated spot $I_x$ on the screen of a cathode ray tube CRT. If this spot is given a "linear sawtooth" sweep a continuously moving pattern will be obtained at typical point P, while if the spot is given a simple harmonic motion, a smoothly oscillating pattern will be generated at P. It will be understood that the movement of the spot is solely parallel to the length of the grating and that no component of movement perpendicular to the length of the grating is employed.

It will be understood that the grating G may be moved, in which case its movement will have a corresponding effect on the pattern at P at which the photoelectric cell is mounted, and in general the screen S will also be a grating. Thus in applying the present invention to the above mentioned scheme of using a continuously moving comparison grating in a system for displacement measurement, the grating G (FIG. 1) will be one of the gratings and the screen S will also be a grating with the photoelectric cell behind it, while the effect of the third grating is obtained by the co-action of the multi-phase light source with one of the gratings. Conveniently the grating G will be the stationary grating and the grating at S will be the moving grating, in which case the multi-phase light source and the photoelectric cell will also remain stationary. However the opposite arrangement is possible, that is to say, the grating G may be the moving grating while the grating at S remains stationary, but in this case the multi-phase light source and the photoelectric cell will move with the grating G.

FIGURE 3 illustrates an arrangement for use where a similar effect to that of a vibrating grating is required, in which case only two light sources $I_4$ and $I_5$ are used which are modulated in anti-phase. The light is collimated as by the lens L and a typical point $Pa$ on the screen is illuminated by rays passing through the grating G at points $X_4$ and $X_5$. The positions of the various parts are so selected that the transmittance at $X_4$ i.e.

$$Tx_4 = \frac{1}{2}\left[1+\sin 2\pi\left(\frac{x-a}{w}\right)\right]$$

and that at $X_5$ i.e.

$$Tx_5 = \frac{1}{2}\left[1+\sin 2\pi\left(\frac{x+a}{w}\right)\right]$$

where $a$ represents the desired amplitude of vibration which must be much smaller than $w$, the periodicity of the grating. The light sources are modulated in such a way that $$I_4 = I(1+\sin 2\pi ft)$$
$$I_5 = I(1-\sin 2\pi ft)$$

It may easily be shown that $$I_p = I\left(1+\sin 2\pi\frac{x}{w}\cdot\cos 2\pi\frac{a}{w} + \cos 2\pi\frac{x}{w}\cdot\sin 2\pi\frac{a}{w}\cdot\sin 2\pi ft\right)$$

It can at once be seen that if P is behind a point of symmetry on the grating $Ga$, there will be no A.C. output from a photocell at $Pa$. If, however, the photocell is not behind a point of symmetry there will be an A.C. output in the photocell.

To enable this effect to be used for locating one grating in relationship to another, the screen $Sa$ is replaced by a second grating and the photocell is located behind the latter. The output of the cell is fed into a phase sensitive detector in which case a null output will be obtained whenever the second grating is symmetrically disposed with respect to the two patterns produced by the modulation of the light sources, in other words, with respect to the first grating $Ga$.

The reference signal for the phase sensitive detector is derived from the same oscillator as is used for the anti-phase modulation of the light sources. It will be understood that such a detector will give a sinusoidal A.C. output of frequency equal to the source modulating frequency, and amplitude algebraically proportional to the displacement from the point of symmetry. Thus as the grating moves through the point of symmetry the output of the detector will decrease to zero, then increase again in opposite phase with respect to the modulating frequency. However if this indication of distance and direction is not considered necessary, simpler means of detection will suffice, e.g. a telephone receiver.

It should be mentioned that in the case of a two-phase source producing the effect of a vibrating grating the effect is not exactly equivalent but for many purposes has even better characteristics. Thus, in the positioning of a main grating, it can be shown that the output of the photoelectric cell does not contain numerous undesirable harmonics whereas in the case of physical vibration of the index grating, such harmonics are present and the use of a synchronous detector is therefore necessary.

As briefly mentioned above an inverse arrangement is possible, i.e. it is possible to interchange the modulation of a multiple light source (two or more phase) used with a single photoelectric cell with corresponding modulation of a multiple detector used in conjunction with an extended light source. Provided that the extended light source is placed in the same position optically as was occupied by the photoelectric cell and the detector components in the same position as was occupied by the multi-phase light source, the optical paths are reversed but the electrical effect is substantially the same.

FIGURE 4 shows the arrangement using a three-phase detector. This corresponds to FIGURE 1 and accordingly the grating is marked G and the screen which is also a grating, the screen necessarily being another grating S. Behind an appropriate part of the screen is located an elongated light source LS, that is to say, a light source long enough to cover the actual area required. Collimating means is again indicated by a lens L and respective beams are thrown on to photoelectric cells marked $PC_1$, $PC_2$, $PC_3$. It is thought that the corresponding two-phase arrangement does not require further illutsration since it will be substantially similar to FIGURE 4 omitting the photoelectric cell $PC_2$. For these cases the light source may be an incandescent lamp of the festoon type and the detector components photo-conductive strips for instance of lead sulphide. A compact arrangement can be obtained by enclosing all the strips in a common envelope.

I claim:

1. A method of generating a modulated electric current simulating that obtained by interposing a moving optical grating in a beam of light falling on a photoelectric cell, which includes the steps of controlling a plurality of beams of light by corresponding zones of an optical grating having its rulings in phase with one another, spaced at distances such that the grating phase difference between the several zones is equal to the periodicity of the grating divided by the number of zones, interposing photoelectric means in the beams so controlled and superimposing on the system constituted by the light beams and photoelectric means modulations corresponding to the several zones, the modulations all being of the same frequency but having a phase difference from one another which is equal to one period of the modulation divided by the number of zones.

2. A method as set forth in claim 1 in which there are two beams.

3. A method as set forth in claim 1 in which there are three beams.

4. A method of producing a modulated light pattern which includes the steps of modulating a plurality of substantially equal light beams at the same frequency but with a phase difference from one another which is equal to one period of the modulation divided by the number of beams, interposing in the beams respective zones of an optical grating, the several zones being spaced at distances such that the phase difference between the several zones is equal to the periodicity of the grating divided by the number of beams, and superposing the modulated beams after they have been intercepted by the grating at the point at which the light pattern is to be produced.

5. A method of producing a modulated electric current simulating that obtained by interposing a moving optical grating in a beam of light falling on a photoelectric cell which includes the steps of interposing in a plurality of substantially equal light beams respective zones of an optical grating having its rulings in phase with one another, the several zones being spaced at distances such that the phase difference between the several zones is equal to the periodicity of the grating divided by the number of zones, interposing respective photoelectric elements in the several beams after they have been intercepted by the respective zones of the grating, modulating the outputs of the respective photoelectric elements all at the same frequency but with a phase difference from one another which is equal to one period of the modulating divided by the number of beams, and combining the modulated outputs of the photoelectric elements.

6. Apparatus for producing a light pattern simulating that obtained by interposing a moving optical grating in a light beam falling on a screen, comprising means for producing a plurality of light beams of substantially equal intensity, means including an optical grating intercepting said beams at zones of the grating so spaced that the relative phase of the zones is equal to one period of a grating divided by the number of beams, means for superimposing a modulation of the same frequency on all the beams, the relative phase of the several modulations being equal to one period of the modulation divided by the number of beams, a screen, and means for superimposing the several modulated beams on the screen after interception by the grating.

7. Apparatus as set forth in claim 6 in which there are three beams.

8. Apparatus as set forth in claim 6 in which there are two beams.

9. Apparatus for producing modulated electric current comprising the combination set forth in claim 6 and photoelectric means located in the light pattern produced on the screen by the superimposed beams.

10. Apparatus for producing a modulated electric current comprising means for producing a wide beam of light, an optical grating having its rulings in phase with one another positioned to intercept the wide beam, means for selecting from said wide beam a plurality of separate beams respectively intercepted by zones of said grating, the relative phase of which zones is equal to the periodicity of the grating divided by the number of separate beams, respective photoelectric elements located in said separate beams after interception by the grating, means for modulating the output of the photoelectric elements all at the same frequency but with a phase relationship equal to the period of the modulation divided by the number of elements, and means for combining the output of the photoelectric elements.

11. Apparatus as set forth in claim 10 in which there are three beams and photoelectric elements.

12. Apparatus as set forth in claim 10 in which there are two beams and photoelectric elements.

13. Apparatus as set forth in claim 6 in which the screen is itself a grating.

14. Apparatus as set forth in claim 13 in which movement is imparted to one of the gratings.

15. Metrological apparatus incorporating a movable optical grating and a stationary optical grating and apparatus as claimed in claim 1 for producing the effect of a third moving grating.

16. Metrological apparatus including a stationary optical grating and a moving optical grating, apparatus as set forth in claim 1 for producing the effect of vibration of one of said gratings and a detector to which the output of the photoelectric means is applied.

17. Apparatus as set forth in claim 16 in which the detector is a phase sensitive detector and the reference signal for the phase sensitive detector is derived from the same source as the modulation of the light sources.

18. Apparatus for producing modulated electric currents comprising two parallel optical gratings, both said gratings being for the same periodicity and each having all its rulings in phase with one another, an elongated light source adjacent the gratings, a plurality of photoelectric cells, means for directing light from the source upon the several cells after action thereon by the gratings at pre-determined spaced zones on one of the gratings the relative phase of which zones is equal to the periodicity of the gratings divided by the gratings to impose a corresponding modulation on the light, means for modulating the output of the photoelectric cells all at the same frequency but with a phase relationship equal to the period of the modulation divided by the number of cells, and means for combining the modulated output of the several cells.

19. Apparatus for simulating the effect of light falling on a photoelectric element after modulation by relative movement between two optical gratings, said apparatus including an optical grating having all its rulings in phase with one another, a light source illuminating the grating over a substantial length and in stationary relationship thereto, a plurality of photoelectric elements in stationary relationship to said grating, means for concentrating upon the photoelectric elements light derived from the illumination of distinct respective zones of said grating, the relative phase of said zones with respect to said grating being equal to the periodicity of said grating divided by the number of photoelectric elements, means for modulating the output of said photoelectric elements all at the same frequency but with a phase relationship equal to the period of the modulation divided by the number of photoelectric elements, and means for combining the modulated output of the photoelectric elements.

20. Apparatus as set forth in claim 19 wherein said gratings, light source, and photoelectric elements are all stationary.

21. Apparatus for producing a signal indicative of the displacement in a predetermined direction of a moving member comprising apparatus as set forth in claim 19 and a second optical grating of the same periodicity as said optical grating and having all its rulings in phase with one another, said second optical grating being optically juxtaposed to said grating so that said second grating acts upon the light derived from the illumination of said zones of said grating, one of said gratings being stationary and the other being secured to the moving member with its longitudinal axis extending substantially in said predetermined direction.

22. Apparatus as set forth in claim 21 wherein said grating, light source and photoelectric elements are stationary, and said second grating is secured to the moving member.

References Cited in the file of this patent

UNITED STATES PATENTS

| | | |
|---|---|---|
| 2,214,621 | Leishman | Sept. 10, 1940 |
| 2,375,665 | Koulicovitch | May 8, 1945 |
| 2,416,968 | Turrettini | Mar. 4, 1947 |
| 2,680,200 | Hercock | June 1, 1954 |
| 2,857,802 | Cail | Oct. 28, 1958 |
| 2,916,826 | Bower et al. | Dec. 15, 1959 |
| 2,929,959 | Jacobs et al. | Mar. 22, 1960 |
| 2,938,126 | Adler | May 24, 1960 |
| 2,993,279 | Bower | July 25, 1961 |

FOREIGN PATENTS

| | | |
|---|---|---|
| 703,039 | Germany | Feb. 26, 1941 |
| 315,921 | Switzerland | Oct. 31, 1956 |